US006880331B1

(12) United States Patent
Hulse et al.

(10) Patent No.: US 6,880,331 B1
(45) Date of Patent: Apr. 19, 2005

(54) METHOD AND APPARATUS FOR CONTROL OF HYDRAULIC SYSTEMS

(75) Inventors: Rob Hulse, Nevada City, CA (US); Bruce Rasmus, Grass Valley, CA (US); Brian Tetzlaff, Santa Monica, CA (US)

(73) Assignee: High Country Tek, Inc., Nevada City, CA (US)

(*) Notice: Subject to any disclaimer, the term of this patent is extended or adjusted under 35 U.S.C. 154(b) by 0 days.

(21) Appl. No.: 10/256,557

(22) Filed: Sep. 27, 2002

(51) Int. Cl.[7] .............................................. F16D 31/00
(52) U.S. Cl. .............................................. 60/368; 60/484
(58) Field of Search .................... 60/368, 484; 340/3.1, 340/3.71; 700/83, 15

(56) References Cited

U.S. PATENT DOCUMENTS

| | | | | | |
|---|---|---|---|---|---|
| 4,811,561 | A | * | 3/1989 | Edwards et al. | 60/368 |
| 5,394,678 | A | * | 3/1995 | Lonn et al. | 56/10.2 H |
| 5,592,382 | A | * | 1/1997 | Colley | 701/207 |
| 6,026,352 | A | * | 2/2000 | Burns et al. | 702/182 |
| 6,273,771 | B1 | * | 8/2001 | Buckley et al. | 440/84 |
| 6,522,964 | B1 | * | 2/2003 | Miki et al. | 701/50 |

FOREIGN PATENT DOCUMENTS

| | | | | | |
|---|---|---|---|---|---|
| WO | WO 9927195 | A1 | * | 6/1999 | E02F/3/36 |
| WO | WO 200052627 | A1 | * | 9/2000 | G06F/19/00 |

* cited by examiner

*Primary Examiner*—Thomas E. Lazo
(74) *Attorney, Agent, or Firm*—Bernhard Kreten

(57) ABSTRACT

An apparatus and method for controlling hydraulic systems. The control apparatus (module) accepts a variety of input forms, and the output is user-configurable to control both sides of an attached coil. The master module is programmable via a graphical user interface defining states and conditions triggering transitions between states. The master module may be combined with slave modules on a connection bus to control many subsystems. Reprogramming of the master module may occur in the field by use of flash memory, and input/output characteristics may be adjusted during operation of the system, allowing adjustment of systems exhibiting nonlinear response characteristics.

6 Claims, 18 Drawing Sheets

| | | | |
|---|---|---|---|
| Log Type: Trend | | | |
| Memory Amount: 1024 | | | |
| Data Protection: ON | | | |
| Time Stamp: ON | | | |
| Sample Rate: 0.5 seconds | | | |
| | | | |
| Time | EngineRPM | FanRPM | Loads |
| 08/08/02 Thu 14:02:35 | 211 | 208 | 208 |
| 08/08/02 Thu 14:02:35 | 211 | 208 | 208 |
| 08/08/02 Thu 14:02:36 | 211 | 208 | 208 |
| 08/08/02 Thu 14:02:36 | 211 | 208 | 208 |
| 08/08/02 Thu 14:02:37 | 211 | 208 | 208 |
| 08/08/02 Thu 14:02:37 | 211 | 208 | 208 |
| 08/08/02 Thu 14:02:38 | 211 | 208 | 208 |
| 08/08/02 Thu 14:02:38 | 211 | 208 | 208 |
| 08/08/02 Thu 14:02:39 | 211 | 208 | 208 |
| 08/08/02 Thu 14:02:39 | 211 | 208 | 208 |
| 08/08/02 Thu 14:02:40 | 211 | 208 | 208 |
| 08/08/02 Thu 14:02:40 | 211 | 208 | 208 |
| 08/08/02 Thu 14:02:41 | 243 | 208 | 208 |
| 08/08/02 Thu 14:02:41 | 211 | 208 | 208 |
| 08/08/02 Thu 14:02:42 | 211 | 208 | 208 |
| 08/08/02 Thu 14:02:42 | 211 | 208 | 208 |

*Fig. 12d*

| | |
|---|---|
| Program Name: DVC70 | |
| Allocation Name: Truck3 | |
| Description: Robinson's truck | |
| Log Type: Event | |
| Memory Amount: 512 | |
| Data Protection: ON | |
| Time Stamp: ON | |
| Variable Names: Loads | |
| | |
| 08/08/02 Thu 14:02:34 | 243 |
| 08/08/02 Thu 14:02:34 | 211 |
| 08/08/02 Thu 14:02:35 | 211 |
| 08/08/02 Thu 14:02:35 | 211 |
| 08/08/02 Thu 14:02:36 | 211 |
| 08/08/02 Thu 14:02:37 | 211 |
| 08/08/02 Thu 14:02:37 | 243 |
| 08/08/02 Thu 14:02:38 | 211 |
| 08/08/02 Thu 14:02:38 | 243 |
| 08/08/02 Thu 14:02:39 | 211 |
| 08/08/02 Thu 14:02:40 | 211 |
| 08/08/02 Thu 14:02:40 | 211 |
| 08/08/02 Thu 14:02:41 | 211 |
| 08/08/02 Thu 14:02:41 | 211 |
| 08/08/02 Thu 14:02:42 | 211 |

*Fig. 12e*

METHOD AND APPARATUS FOR CONTROL OF HYDRAULIC SYSTEMS

BACKGROUND OF THE INVENTION

Typical systems under hydraulic control encompass a huge universe and include garbage trucks, nut harvesters, rock crushers, tub grinders, drilling machines, compactors, and grape harvesters. Control systems for hydraulic devices such as these have been developed and are currently in use. The major problem attending control of such devices is the lack of small-scale control of the systems. Large-scale control is simple: lifting, lowering, shaking, etc. Small-scale control can be analogized to fine motor control in humans, e.g., how much force to use when setting something down, or how much force to use when shaking fruit or nuts from a tree.

Lack of small-scale control results in damage: trees shaken too hard are uprooted; garbage cans set down too hard crack under the force; and workpieces are overground or overdrilled. Such damage can be avoided by the use of "smart" controllers: a controller that, for example, (1) picks up a receptacle, empties it, and, remembering where the ground is, sets it down without damaging it, or (2) harvests nuts by shaking the trees without damaging the tree. Unfortunately, smart controllers are rare, and, if unable to be modified subsequently, must of necessity define parameters based on extreme conditions, which is inefficient, since it can lead to oversizing, overpowering, or worse, inadequate performance.

SUMMARY OF THE INVENTION

The present invention is characterized by its use of a master module having the ability to accept a variety of inputs and be programmed by a user to produce appropriate outputs. More specifically, the present invention includes a master control module that controls several subsystem devices. The master module may be located on a bus with other slave devices/modules, each controlled by the master module. Several slave devices/modules (e.g., input, output, network bridge, memory, etc.) may be controlled with one master module.

The master module accepts a variety of inputs, equipped with analog inputs, digital inputs, and universal inputs, which accept a variety of sensor devices. It has both on/off and proportional outputs, in which both the high and low sides of a connected coil may be controlled. LEDs indicate the state of each connection.

Programming takes place through a graphical user interface on a computer (or other input device). The program is in a visual format, allowing the user to specify several nodes through which the sequence travels and the transitional sequences that direct the path from one node to another. The input/output profile is depicted graphically, and the user may adjust the curve itself by adjusting the points on the curve. Adjustments may also be made while the controller is running. Thus, control of nonlinear response or of output having unknown characteristics may be achieved. Flash memory allows reprogramming in the field.

During operation, additional modules allow collection and storage of time-stamped (if desired) device data, which may be transferred to a PC for subsequent display, manipulation, and analysis. Other modules allow data transfer between devices that use different bus protocols and control of devices located on a bus utilizing a different protocol.

OBJECTS OF THE INVENTION

It is a primary object of the present invention to provide a new and novel method and apparatus to allow "intelligent" configuration and control of hydraulic systems.

It is a further object of the present invention to provide a method and apparatus as characterized above utilizing a graphical user interface that may be programmed by a user without advanced knowledge of high-level programming languages, and thus avoids high outside programming costs.

It is a further object of the present invention to provide a method and apparatus as characterized above that provides for control of systems with nonlinear response characteristics in real time, while the system is in operation.

It is a further object of the present invention to provide a method and apparatus as characterized above that allows a user to control both high and low sides of an attached valve coil.

It is a further object of the present invention to provide a method and apparatus as characterized above that is versatile with respect to acceptable input forms.

It is a further object of the present invention to provide a method and apparatus as characterized above that indicates the state of the accompanying system via LED display.

It is a further object of the present invention to provide a method and apparatus as characterized above that collects and stores data from the active system for subsequent transfer to an external PC for manipulation and analysis.

It is a further object of the present invention to provide a method and apparatus as characterized above that may be integrated into a connection bus to control other modules according to the same programming.

It is a further object of the present invention to provide a method and apparatus as characterized above to provide a link that communicates with and capture data from devices located on a connection bus having a different bus protocol.

It is a further object of the present invention to provide a method and apparatus as characterized above to provide a link that allows control of a device located on a connection bus that utilizes a different bus protocol.

Viewed from a first vantage point, it is an object of the present invention to provide a system for control of and bidirectional communication between a central controller and a plurality of subsystems operatively dispersed on the system, comprising, in combination: each subsystem linked to both the controller and a work-performing device, having hydraulic fluid controlling operation of the device, the controller including means to modify operating criteria on each subsystem, the hydraulic fluid integrated in the system and distributed to each subsystem in accordance with the criteria as modified by the controller to effect change to the hydraulic fluid controlled device.

Viewed from a second vantage point, it is an object of the present invention to provide a method for programming logic sequences, the steps including: orienting a plurality of reference points in a graphical user interface; specifying a state for each reference point; designating one of the reference points as a starting point; and identifying conditions under which transition between reference points occurs, wherein the plurality of reference points and the conditions form a logic sequence depicted in the graphical user interface.

Viewed from a third vantage point, it is an object of the present invention to provide a system for creating a universal microprocessor-based control system for hydraulics, comprising, in combination: a master module having a plurality of inputs and outputs; a plurality of slave modules, wherein each slave module has a plurality of inputs and outputs; a connection bus interposed between the master module and the plurality of slave modules, the connection bus transmitting information therebetween; a work-performing device connected to at least one of the outputs on the master module or the slave module, wherein the work-performing device has hydraulic fluid controlling operation of the device.

Viewed from a fourth vantage point, it is an object of the present invention to provide a method for graphically defining and managing input/output functions for a controller, the steps including: connecting a controller and a work-performing device displaying output for the work-performing device as a function of input in a graphical format; specifying a plurality of movable points on the graphical format; and allowing control of nonlinear response of the work-performing device by the controller via movement of the plurality of movable points.

Viewed from a fifth vantage point, it is an object of the present invention to provide a control apparatus for hydraulic valve systems, comprising, in combination: analog input means; non-analog input means; and output means responsive to input received by the analog input means and the non-analog input means, wherein the analog input means and the non-analog input means share a common portal.

Viewed from a sixth vantage point, it is an object of the present invention to provide a control apparatus for hydraulic valve systems, comprising, in combination: input means having a single portal, wherein the input means are responsive to inputs comprising analog input and non-analog input; and output means responsive to the inputs received by the input means.

Viewed from a seventh vantage point, it is an object of the present invention to provide a control apparatus for control of hydraulic valves, comprising, in combination: input means, the input means programmable by a user; and output means responsive to the input means, wherein the output means include a coil having a high side and a low side and means for controlling both sides.

Viewed from a seventh vantage point, it is an object of the present invention to provide a module for linking a control system having a network which alters hydraulic means, comprising, in combination: network connection means; nonvolatile memory means communicating through the network communication means to store a plurality of data streams sent through the network connected through the network connection means; and output means to export stored data from the nonvolatile memory means.

Viewed from a eighth vantage point, it is an object of the present invention to provide a network bridge module for a hydraulic equipment control system which spans between first and second networks respectively having first and second protocols, comprising, in combination: a first network connection means; a second network connection means; and relay means, wherein the relay means allow communication between the first connection means connected to the first network and the second connection means connected to the second network, and wherein control messages sent over the first network to a device on the second network through the relay means effect control of the device on the second network.

Viewed from a ninth vantage point, it is an object of the present invention to provide a user-interface module for a hydraulic device control system, comprising in combination: network communication means, wherein the network communication means receives programming from an external source having an output, the output monitored by display means, wherein content of the display means is determined by programming received over a network through the network communication means; and input means feeding the network, the input means responsive to manual external input, wherein the manual external input is controlled from a series of choices contained on the display means.

Viewed from a tenth vantage point, it is an object of the present invention to provide a system for control of hydraulic devices, comprising in combination: a master module having inputs and outputs, the master module programmable by a user; and a plurality of slave modules, the plurality of slave modules chosen from the group consisting of: modules providing additional inputs; modules providing additional outputs; modules providing a user-interface into the system; modules providing nonvolatile memory storage; modules providing a network bridge between the system and a network utilizing a different protocol than the system; modules providing a display of system status; and modules providing a combination of additional inputs and additional outputs.

These and other objects will be made manifest when considering the following detailed specification when taken in conjunction with the appended drawing figures.

BRIEF DESCRIPTION OF THE DRAWINGS

FIGS. 12*d*–12*e* show data capture screens for a memory module.

DESCRIPTION OF PREFERRED EMBODIMENTS

Figure 1A:
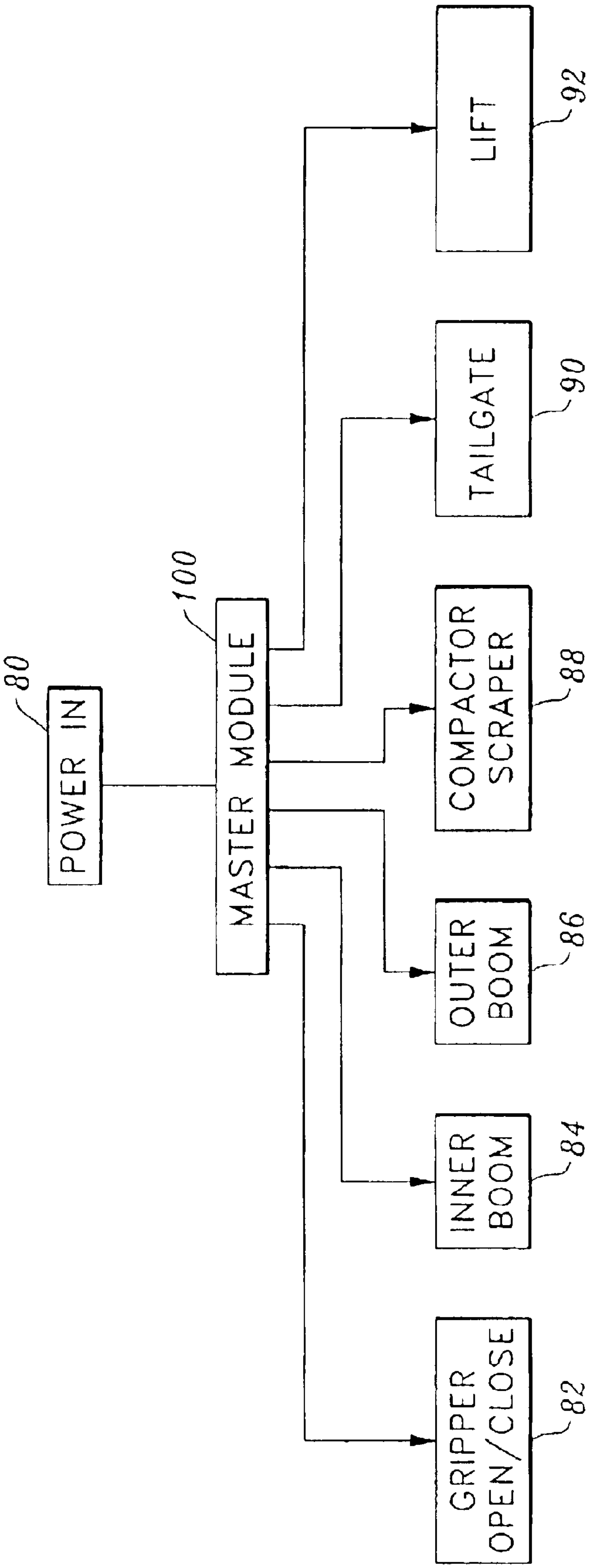
FIG. 1*a* depicts one embodiment of the present invention.

Considering the drawings, wherein like reference numerals denote like parts throughout the various drawing figures, reference numeral 10 is directed to the control system according to the present invention.

In its essence, the control system 10 is comprised of a master module 100 having multiple inputs 106, including analog, digital, and universal inputs. Universal inputs are programmable; they accept input from various types of sensors. Outputs 104 on the master module 100 include both on/off and proportional outputs. These outputs 104 allow a multitude of different output configurations to be programmed. LED indicator lights 110*a*–g on the master module 100 display the status of the various connections. The master module 100 may be used on its own or it may be combined with a plurality of slave modules 200*a–h* for control over a larger system (FIG. 4), preferably on a DeviceNet-compatible CAN Bus system.

Figure 5:
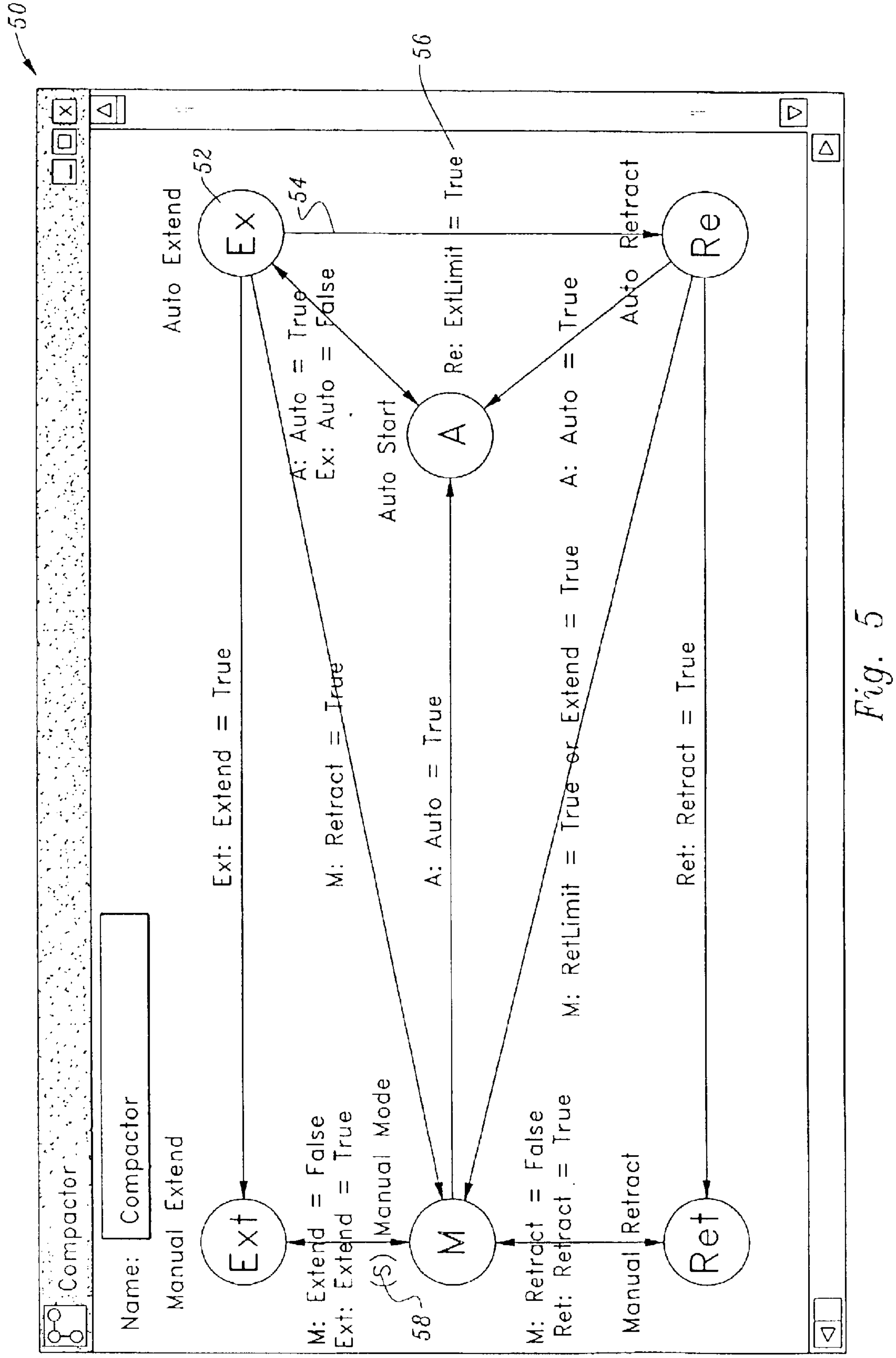
FIG. 5 is a pictorial representation of a program for the master module.

Master module 100 is programmable by use of a graphical programming environment 150 (FIG. 5). The resulting program is transferred to the master module 100, preferably through a RS-232 serial connection, where it then resides in the master module 100. The programming environment 150 allows adjustment of the response curve 168 itself. The master module 100 is equipped with flash memory and may be reprogrammed in the field. The master module 100 controls all aspects of the system 10 along the connection bus 202, including the slave modules 200*a–h.*

One embodiment of the control system 10 is provided in FIG. 1*a*, which represents the use of the master module to control a garbage truck. The master module 100 accepts power in 80 and inputs from and outputs to six components of the truck's operation. The gripper 82 controls gripping the garbage can for transport; the inner boom 84 and the outer boom 86 control the horizontal and vertical location of the garbage can; the compactor/scraper 88 controls the compacting of garbage that has been emptied into the truck; the tailgate 90 is either open or closed for allowing garbage into the truck, and the lift 92 controls the lifting of the truck bed for emptying the truck. All of these functions are controlled by one master module 100, with a subset of inputs and outputs dedicated to each function.

Figure 1B:
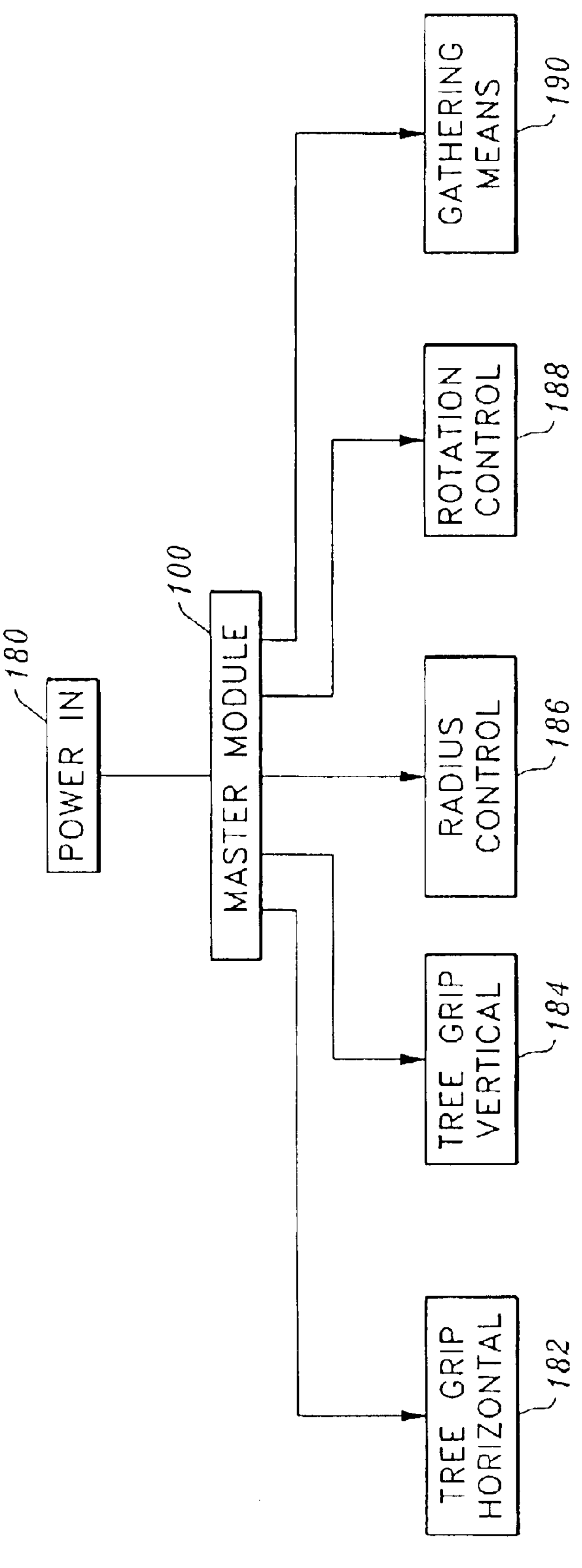
FIG. 1*b* depicts a second embodiment of the present invention.

A second potential embodiment is shown in FIG. 1*b*, which depicts a control system as applied to a nut or fruit harvester. The master module 100 accepts power in 180 and inputs from and outputs to five components of the harvester's operation. The harvester grips the tree, utilizing horizontal control 182 and vertical control 184. The harvesting itself is accomplished by shaking the tree. Shaking motion may be controlled by an eccentric rotation defined by a radius component 186 and a rotational component 188. A gathering means control 190 is activated when the nuts are gathered during shaking and when the gathering means is full.

Figure 2:
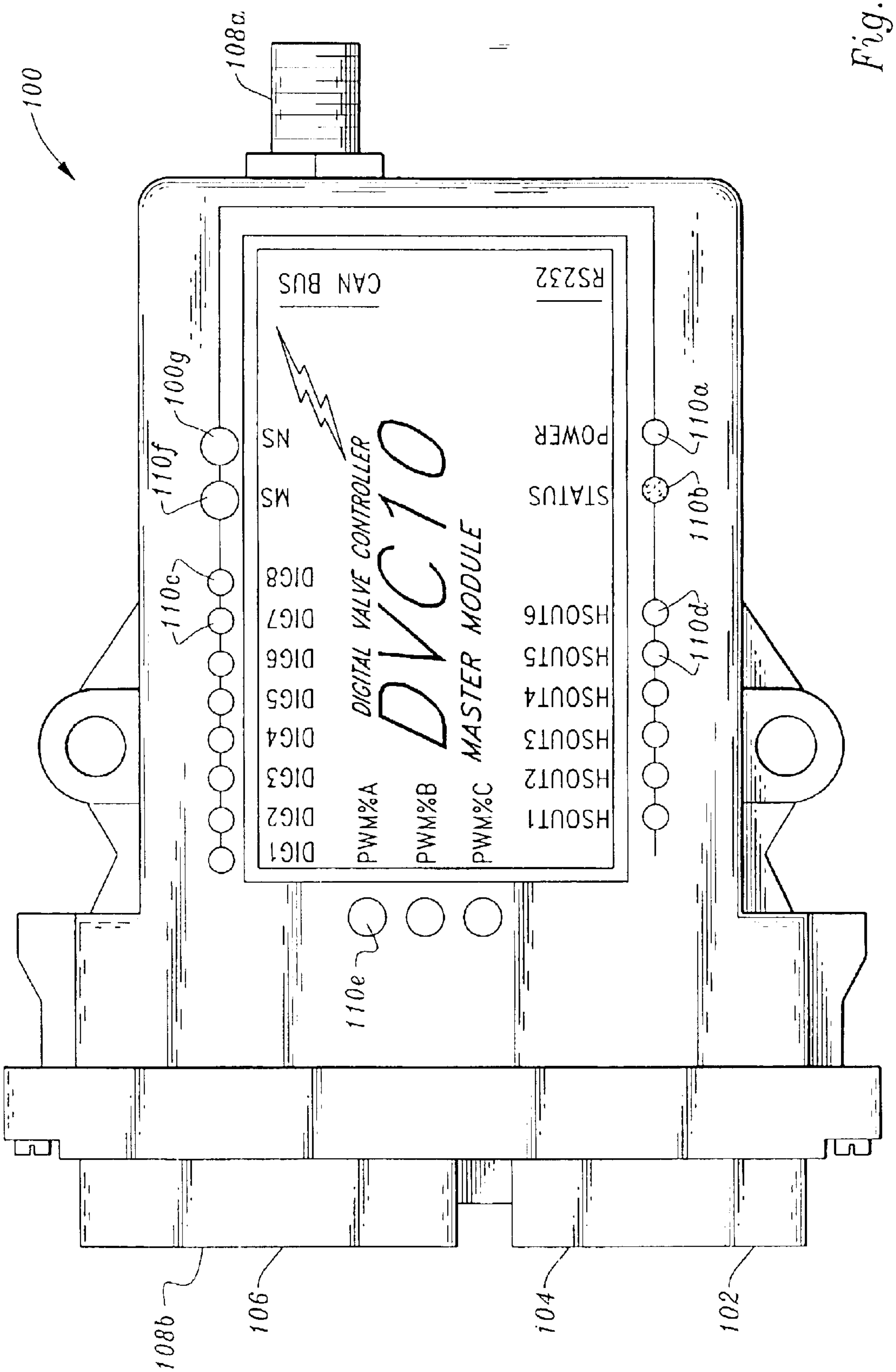
FIG. 2 is a diagram of the connection and indicator features of the master module.

Referring now to FIG. 2, the master module 100 has a wide variety of input and output capabilities. As shown, the master module 100 includes a power supply connection 102, output connections 104, input connections 106, and two types of communications inputs 108*a,b*. Several LED indicators 110*a*–g are also present, for displaying the current status of the system 10.

Preferably, the power supply for the master module 100 operates over the full range of 8.5 Vdc to 32 Vdc and may be configured for high current applications. Output connections 104 for the master module 100 shown in FIG. 2 include six high-side outputs and three proportional (pulse-width-modulated (PWM)) outputs, which may be connected in various ways. All outputs are short-circuit protected and the proportional outputs may be configured to a specific current range for maximum sensing.

Input connections 106 for the master module 100 as shown include three analog/potentiometer inputs, eight digital (on/off) inputs, and three universal inputs. Each universal input may be programmed to accept analog voltage/current input, quadrature pulse input, counter pulse input, or RPM pulse input through the programming environment 150. Thus, any of several types of sensors may be connected to the master module 100.

The master module 100 connects to other devices (i.e., slave devices 200*a–h*) preferably via CAN bus connector 108*a*. An RS-232 port 108*b* allows connection to a PC on which the programming environment 150 is configured or to an external display.

Finally, a plurality of LEDs 110*a*–g are present on the master module 100. As shown, the master module 100 has a power LED 110*a*, a status LED 110*b*, eight digital input status LEDs 110*c*, six high-side output driver status LEDs 110*d*, three proportional output driver status LEDs 110*e*, and two CAN bus LEDs 110*f,g*. Each LED indicates status for its associated component (color descriptions are exemplary):

- Power LED 110*a*: Blinks if the power supply voltage is above +30 Vdc. Turns off if the power supply voltage drops below +8.0 Vdc.

Status LED 110*b*: This LED is programmable and is commonly used for error status or blink codes.

Digital Input Status 110*c*: Turns on when the corresponding input is activated. Inputs can be programmed as active high or low.

- High-Side Output Driver Status 110*d*: Turns on when the corresponding High-side output is activated. Blinks once per second for an open circuit. Blinks four times per second for a short circuit.
- Proportional Output Driver Status 110*e*: This LED displays minimum to maximum current status for the corresponding PWM output. The LED will display from red to green as the current changes from 0% to 100% (50% displaying yellow).
- CAN Bus LED: Module Status (MS) 110*f:*
  - Off—There is no power applied to the module.
  - On green—The module is operating in a normal condition.
  - Flashing green—Device in standby state. May need commissioning.
  - Flashing red—Recoverable Fault.
  - On red—Module has an unrecoverable fault.
  - Flashing Red/Green—Device is in self-test.
- CAN Bus LED: Network Status (NS) 110*g:*
  - Off—Device is not on-line.
  - Flashing green—Device on-line; no established connection to other nodes.
  - On green—Device on-line; established connection to other nodes.
  - Flashing red—One or more connections are in a timed-out state.

On red—The device has detected an error rendering it incapable of communicating on the network.

Figure 3A:
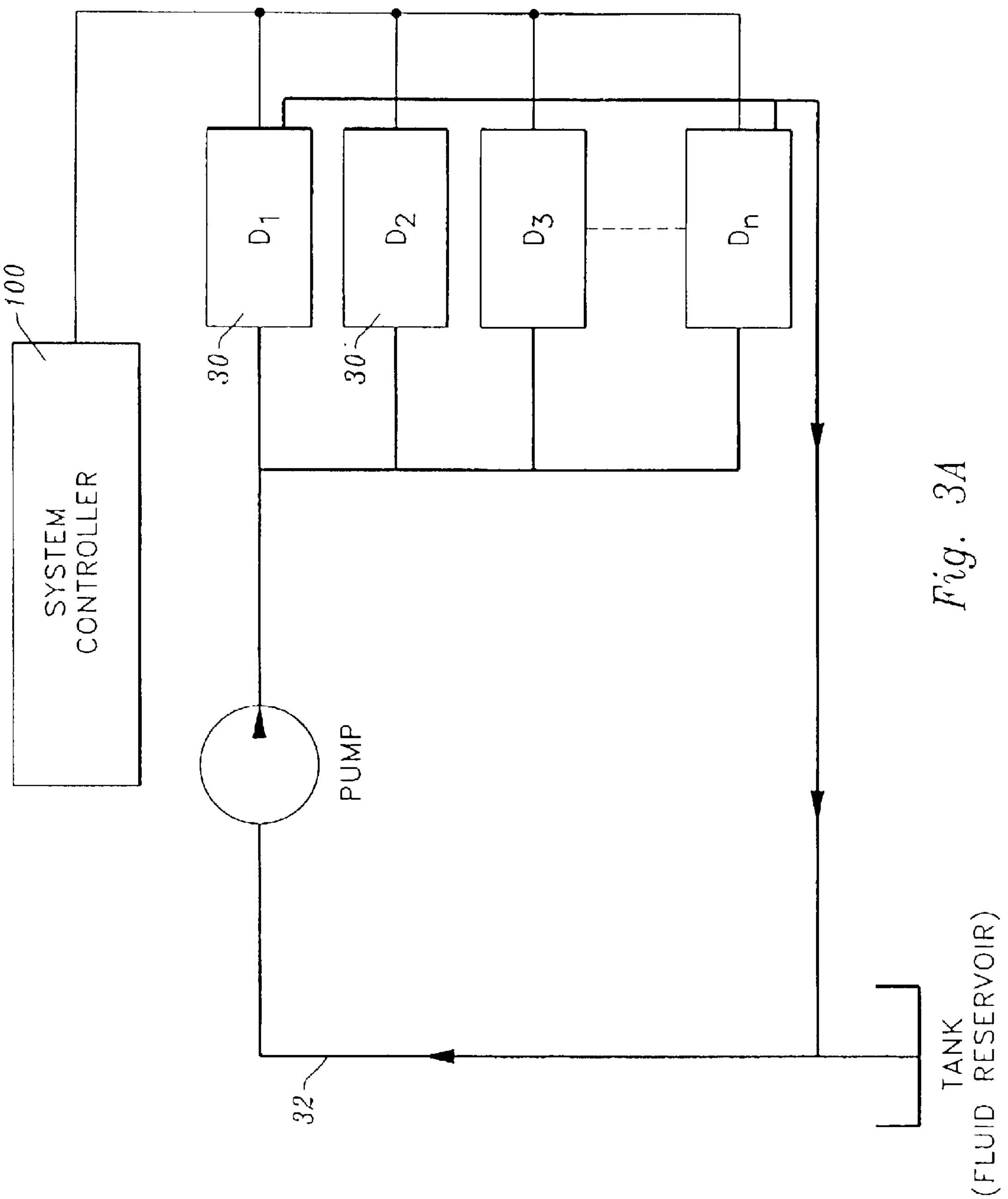
FIGS. 3*a* and 3*b* depict the relationship of the controller to the system, in two embodiments.
Figure 3B:
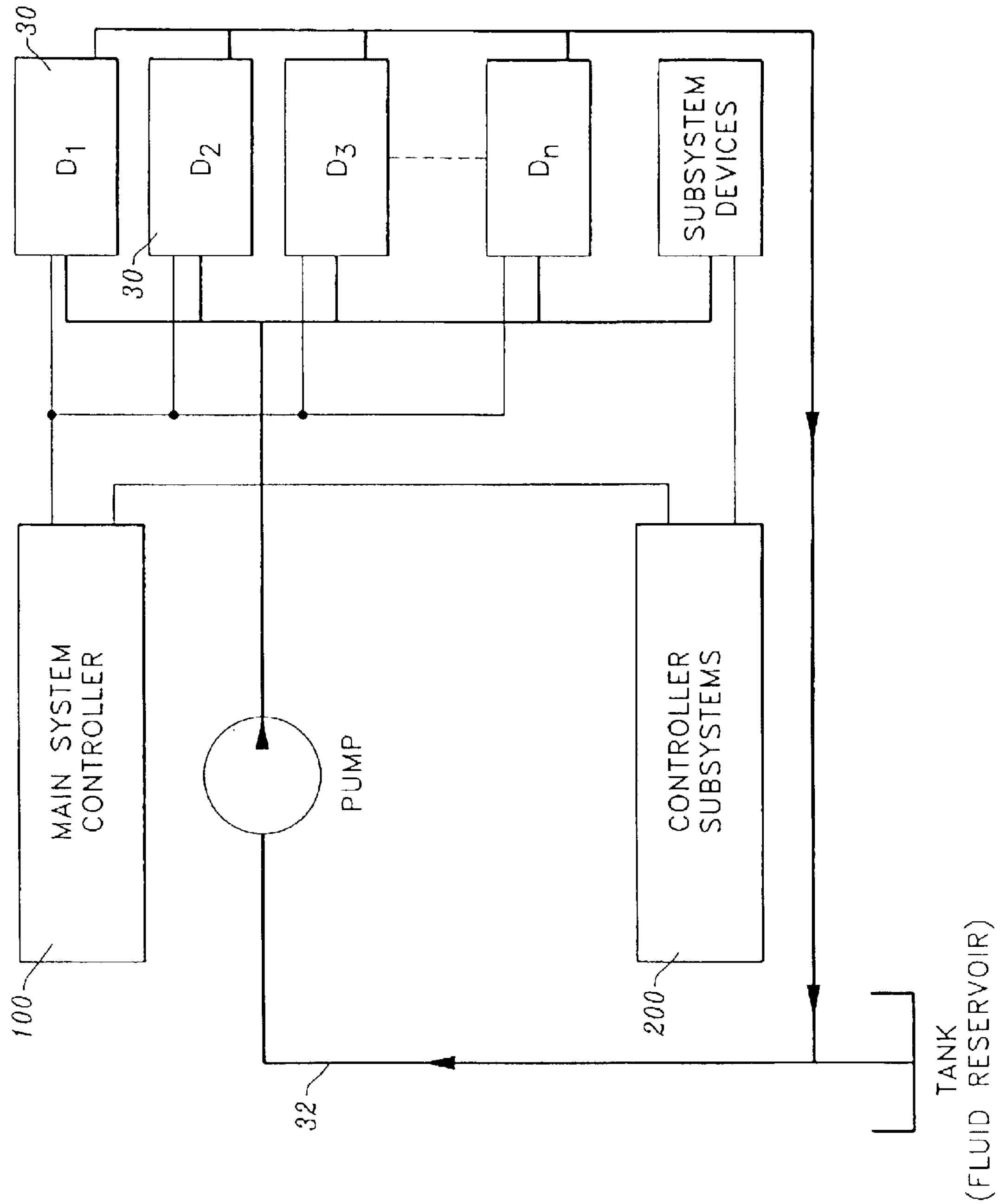

As shown in FIG. 3A, the master module 100 is connected to several subsystem devices 30 that are all present on the same hydraulic flow circuit 32. Each subsystem device 30 may be individually controlled. Alternatively, FIG. 3*b* shows a setup in which the master module 100 itself also has subsystems, or slave devices 200*a*–h.

Figure 6:
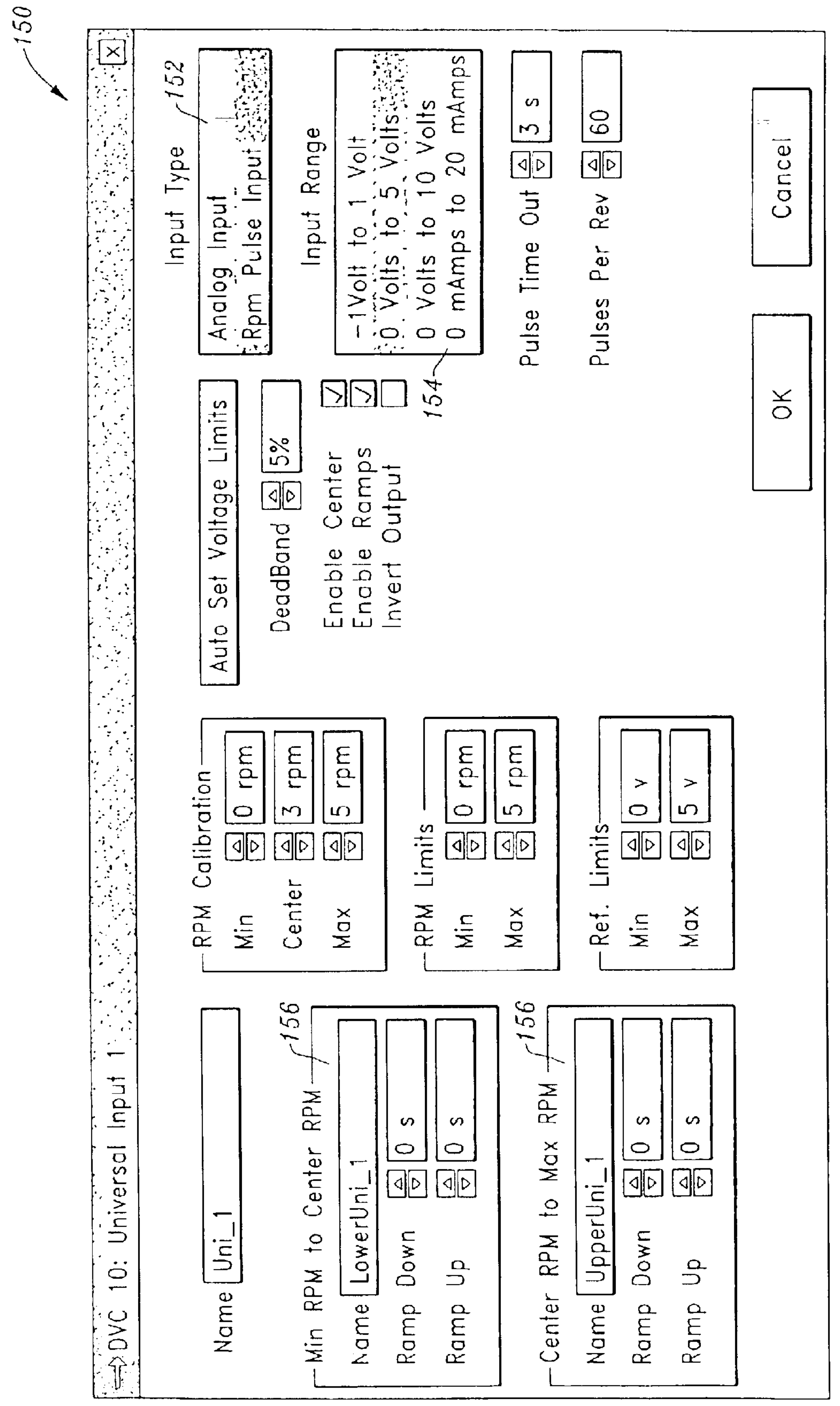
FIG. 6 shows the universal input options for the master module.
Figure 7:
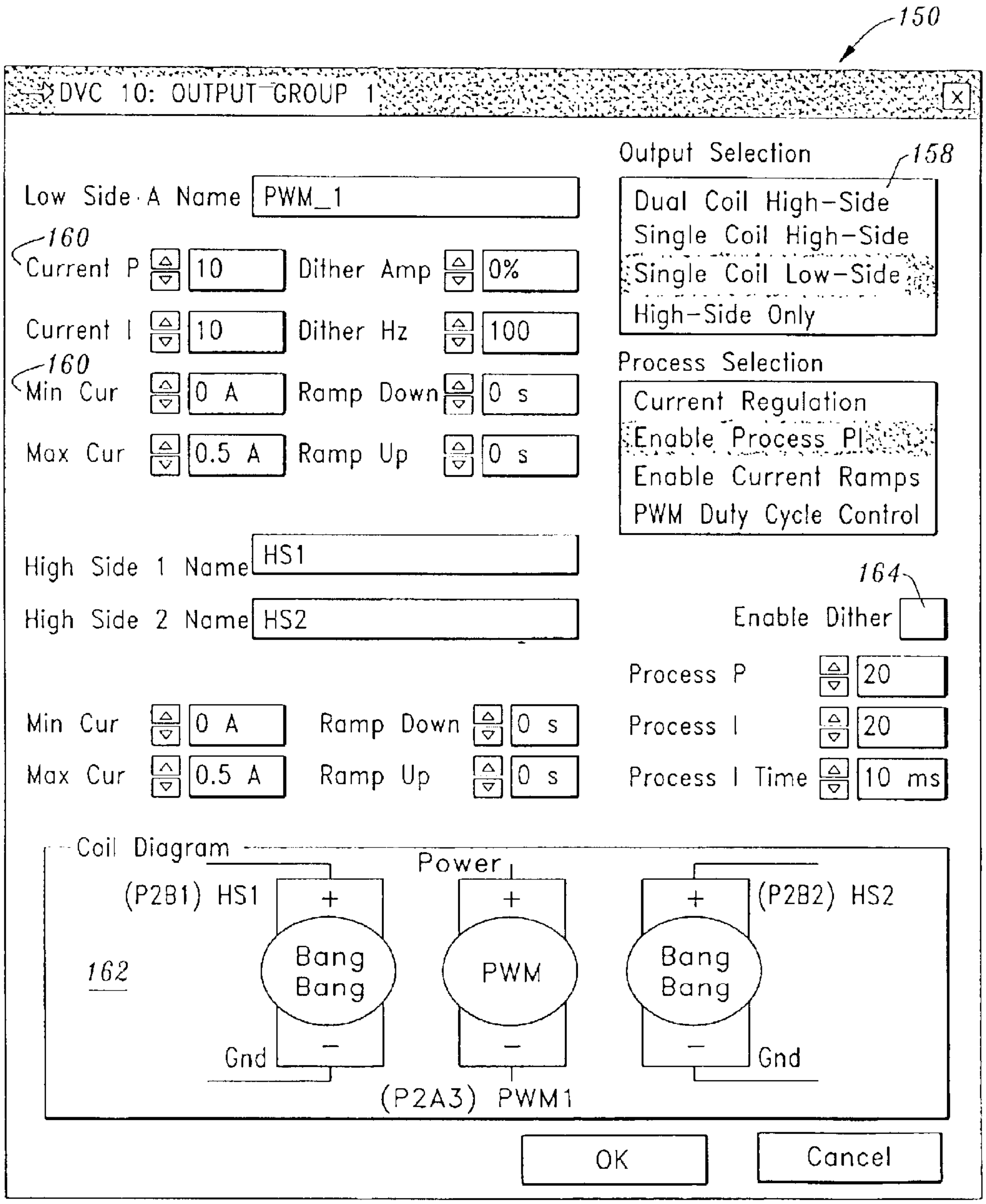
FIG. 7 shows possible output group configurations according to the present invention.
Figure 8:
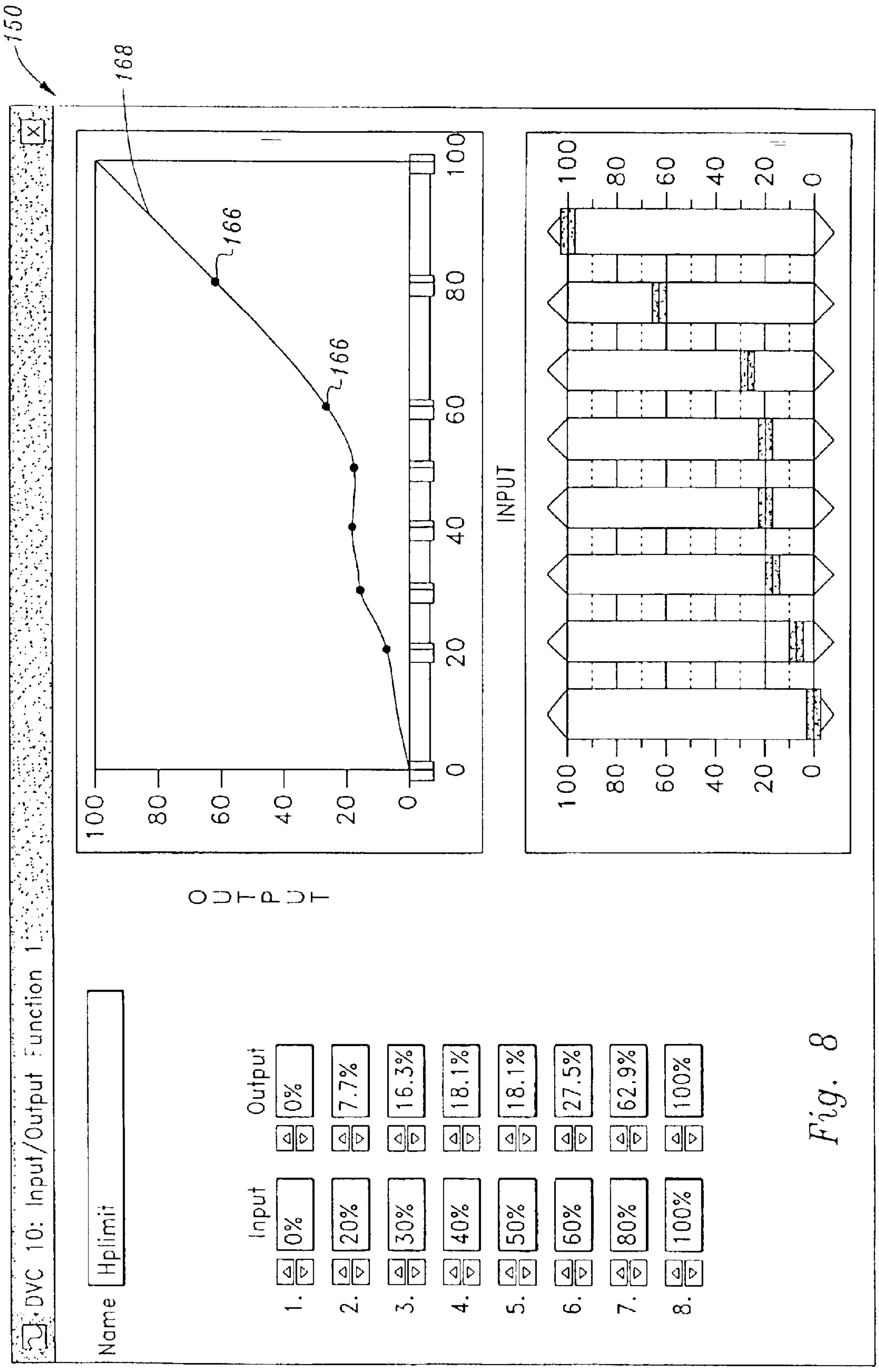
FIG. 8 shows an input/output function graph according to the present invention.

Aspects of the inputs 106 and outputs 104 are controlled in the programming environment 150 (FIGS. 6–8). FIG. 6 shows the setup screen for a universal input. To set up a universal input, one selects an input type 152 and input range 154, and sets various parameters 156 pertaining to that particular type of input.

The output groups are similarly configured, shown in FIG. 7. One selects the output type 158 and sets its parameters 160. A coil diagram 162 for the system is also present. For high-frequency proportional outputs, the user may enable dither 164, which adds low-frequency dither to the output. Dither is used to make up for friction-related factors, stiction and hysterisis, that make controlling the valves seem erratic and unpredictable. Friction of a sliding object causes a reduction in distance moved. Stiction can keep the spool from moving for small control input changes, such that the spool moves too far when the control input changes enough to free the spool. In such a case, the force required to move the spool is more than is required to achieve the desired spool shift. Hysterisis can cause the spool shift to be different for the same control input, depending on whether the control is changing up or down. The friction of the moving spool is resisting the current's attempt to move it, so the spool shift will be less than that desired. The direction the spool was shifting determines if the spool shifts too far or not far enough.

Dither is a rapid, small movement of the spool about the desired shift point. It is intended to keep the spool moving to avoid stiction and average out hysterisis. Dither must be large and slow enough to make the spool move and small and fast enough not to cause pulsing or resonance in the system. The goal is to provide just enough dither to fix the problems without creating new ones.

Low-frequency pulse-width modulation (PWM) (typically less than 300 Hz) generates dither as a by-product of the PWM process. The amount of dither changes as the average coil current changes, reaching a maximum at 50% duty cycle. This may result in too much dither at some current levels and not enough at other levels. Different spools have different responses to the same dither current. Changing the PWM frequency will allow adjustment of the dither, but the amplitude and frequency of the dither cannot be independently adjusted. When the PWM frequency is high enough (typically above 5 kHz), the coil current will not have time to change significantly, and no byproduct dither is produced. Addition of dither during high-frequency PWM can thus be regulated, unlike during low-frequency PWM. The dither amplitude and frequency may be independently adjusted for maximum positive effect with minimal problems.

FIG. 8 depicts input/output functions of the master module 100 that may be individually programmed. There are eight input/output functions that can be programmed individually. The I/O function gives the user the ability to change the response of the output with the change of the input. The input and output is based on zero to 100% (Min. to Max.). Different adjustable points 166 on the response curve 168 give the user full flexibility to control non-linear responses. These functions are adjustable while the controller is running, allowing adjustment of unknown output characteristics.

The programming environment 150 is used to program operations for the master module 100. The programming environment 150 utilizes a graphical interface and requires knowledge of the PC's operating system, light programming, and electro-hydraulics. At the outset, states 52 are entered, along with transitions 54 connecting the states 52, on the programming screen 50. Each transition 54 connects two states 52. States 52 are points in the program in which a particular logic sequence is repeated until a transition condition 56 is met. When the transition condition 56 is met, the program will change states 52. The states 52 and transitions 54 form a picture of the program that will be executed, shown in FIG. 5. The program represented in FIG. 5 is that for a compacting device. After graphically representing the program, the actual states and transitions are entered.

FIG. 5 contains states 52 with captions. Above the state 52 is a description. The starting point's description always starts with an "(S)" 58. In this example the starting point is the state 52 with the caption "M". Transitions 54 are the lines that connect two states 52. If the transition 54 goes in only one direction, there will be only one arrowhead. If there are two arrowheads, it is necessary to know how to read the transition condition. If a transition condition is listed as "M: Retract=False", it is read as "Go to M When Retract=False". The first chart depicts the setup of input 106 and output 104 for this system. The second chart is a list of all the states 52 and the respective transition conditions 56 for the program depicted in FIG. 5.

Input and Output Configurations

| Name | Function | Type |
|---|---|---|
| Auto | Starts the Auto Cycle | Digital Input |
| Extend | Manual Cylinder Extend | Digital Input |
| Retract | Manual Cylinder Retract | Digital Input |
| ExtLimit | True when the Cylinder is fully extended | Digital Input |
| RetLimit | True when the Cylinder is fully retracted | Digital Input |
| ExtSol | Bang-Bang valve that extends the Cylinder | Digital Output |
| RetSol | Bang-Bang valve that retracts the Cylinder | Digital Output |

States and Transitions

| State | Caption | Function |
|---|---|---|
| Manual Mode | M | Turn off Solenoids<br>Go to Ext when Extend is True<br>Go to Ret when Retract is True<br>Go to A when Auto is True |
| Manual Extend | Ext | Turn on the Extend Solenoid<br>Go to M when Extend is False |
| Manual Retract | Ret | Turn on the Retract Solenoid<br>Go to M when Extend is False |
| Auto Start | A | Turn off Solenoids<br>Go to Ex when Auto is False |
| Auto Extend | Ex | Turn on Extend Solenoid<br>Go to A when Auto is True<br>Go to M when Retract is True<br>Go to Ext when Extend is True<br>Go to Re when ExtLimit is True |
| Auto Retract | Re | Turn on the Retract Solenoid<br>Turn off the Extend Solenoid<br>Go to A when Auto is True<br>Go to M when RetLimit is True or Extend is True<br>Go to Ret when Retract is True |

Figure 4:
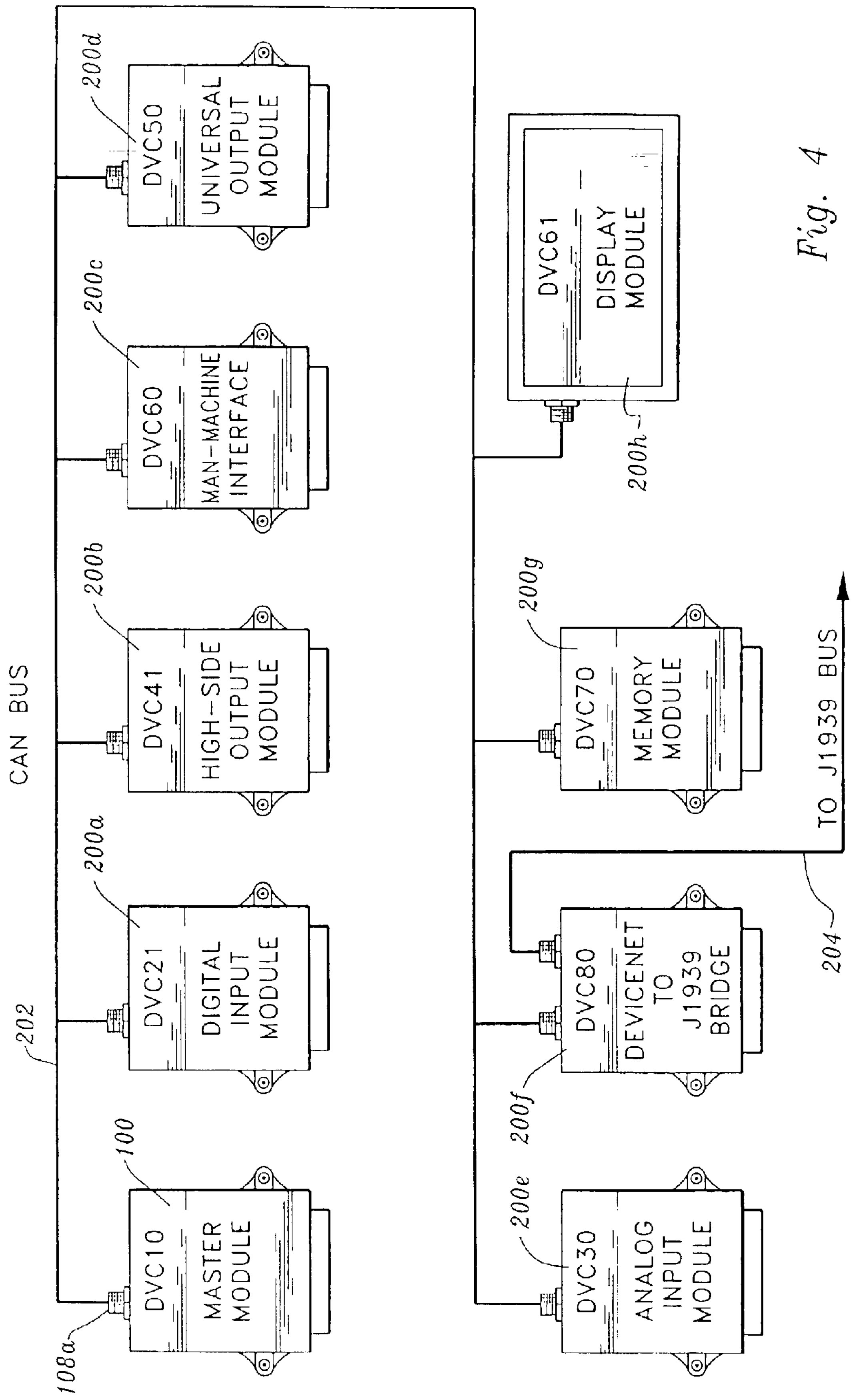
FIG. 4 shows the expansion of the master/slave system according to the present invention.

The master module 100 may be used alone, or it may be used as in FIG. 4, with several slave modules 200*a*–h. As the name implies, the slave modules 200*a*–h receive instruction from the master module 100 along a connection bus 202, preferably a DeviceNet-compatible CAN bus. Addition of slave modules 200*a*–h allows control of a larger system and monitoring of specific functions.

To create a larger system, one may add a digital input module 200*a*, a high-side output module 200*b*, an analog input module 200*e*, or a universal I/O module 200*g*. One may also connect and communicate with additional master modules 100.

Figure 9:
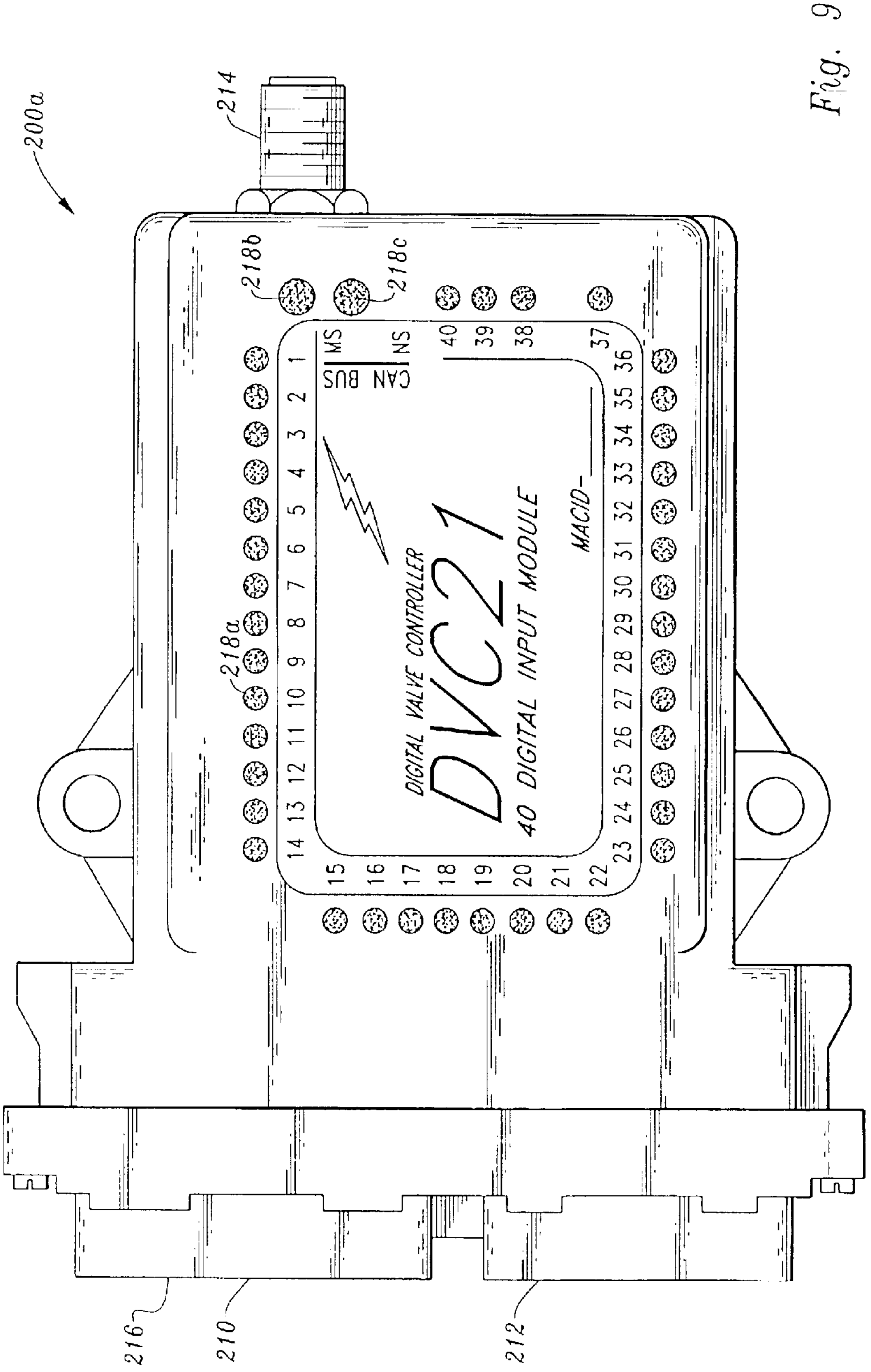
FIG. 9 depicts a module having additional digital inputs.

The digital input module 200*a* (FIG. 9) provides for additional digital inputs to the system. The module 200*a* has power connectors 210, digital input connectors 212 (a combination of sinking and sourcing connectors), a bus connector 214, preferably for connection to a DeviceNet-compatible CAN bus, and a communication port 216, preferably an RS-232 port, for monitoring and setting the node number. LEDs 218*a*–c indicate status of each input 218*a*, the status of the module 218*b*, and the status of the network 218*c*.

Figure 10:
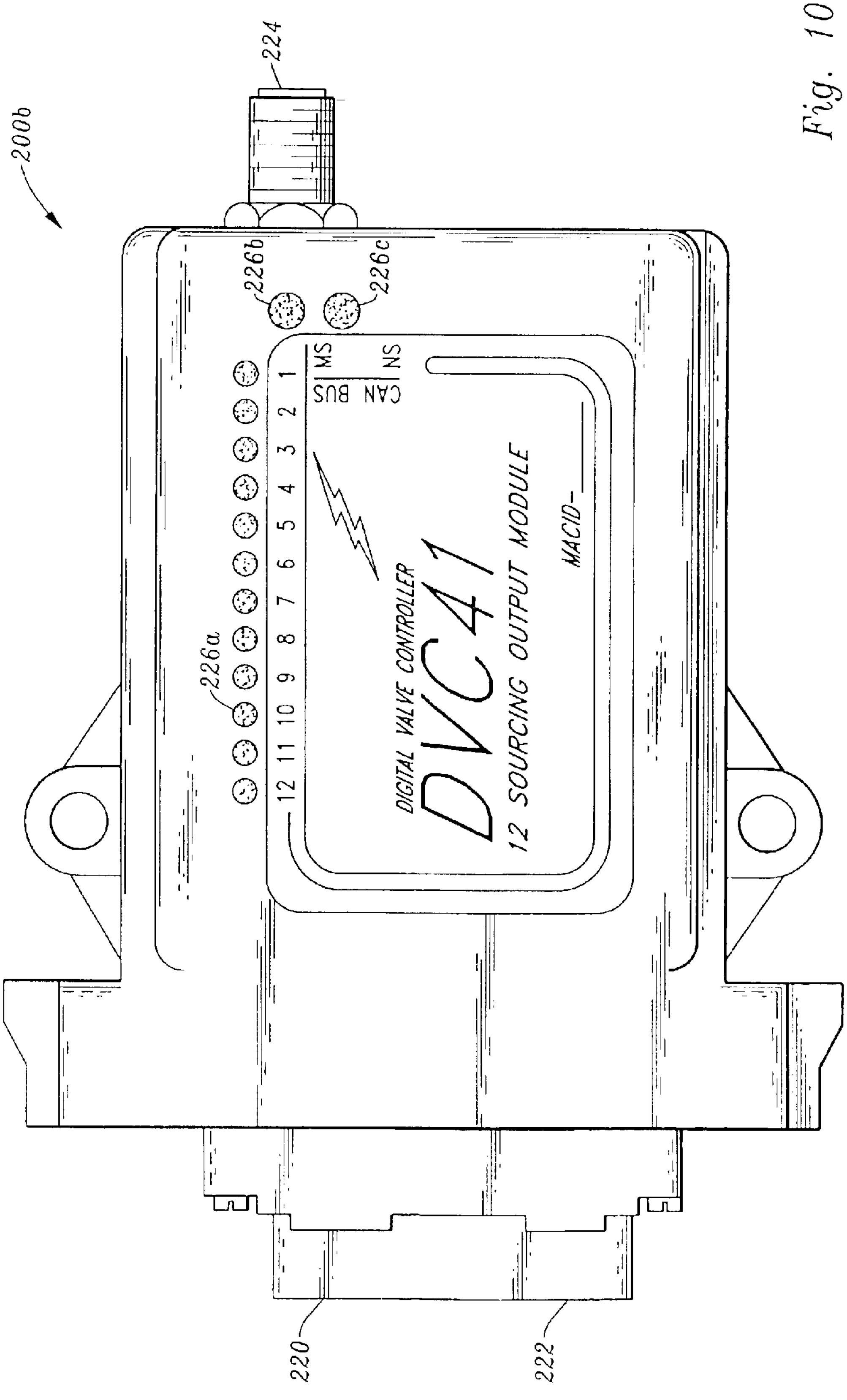
FIG. 10 depicts a module having additional high-side outputs.

The high-side output module 200*b* (FIG. 10) provides additional high-side outputs to the system. The module includes power connectors 220, output connectors 222, and a bus connector 224, preferably for connection to a DeviceNet-compatible CAN bus. LEDs 226*a*–c indicate status of each output connection 226*a*, the status of the module 226*b*, and the status of the network 226*c*.

Figure 13:
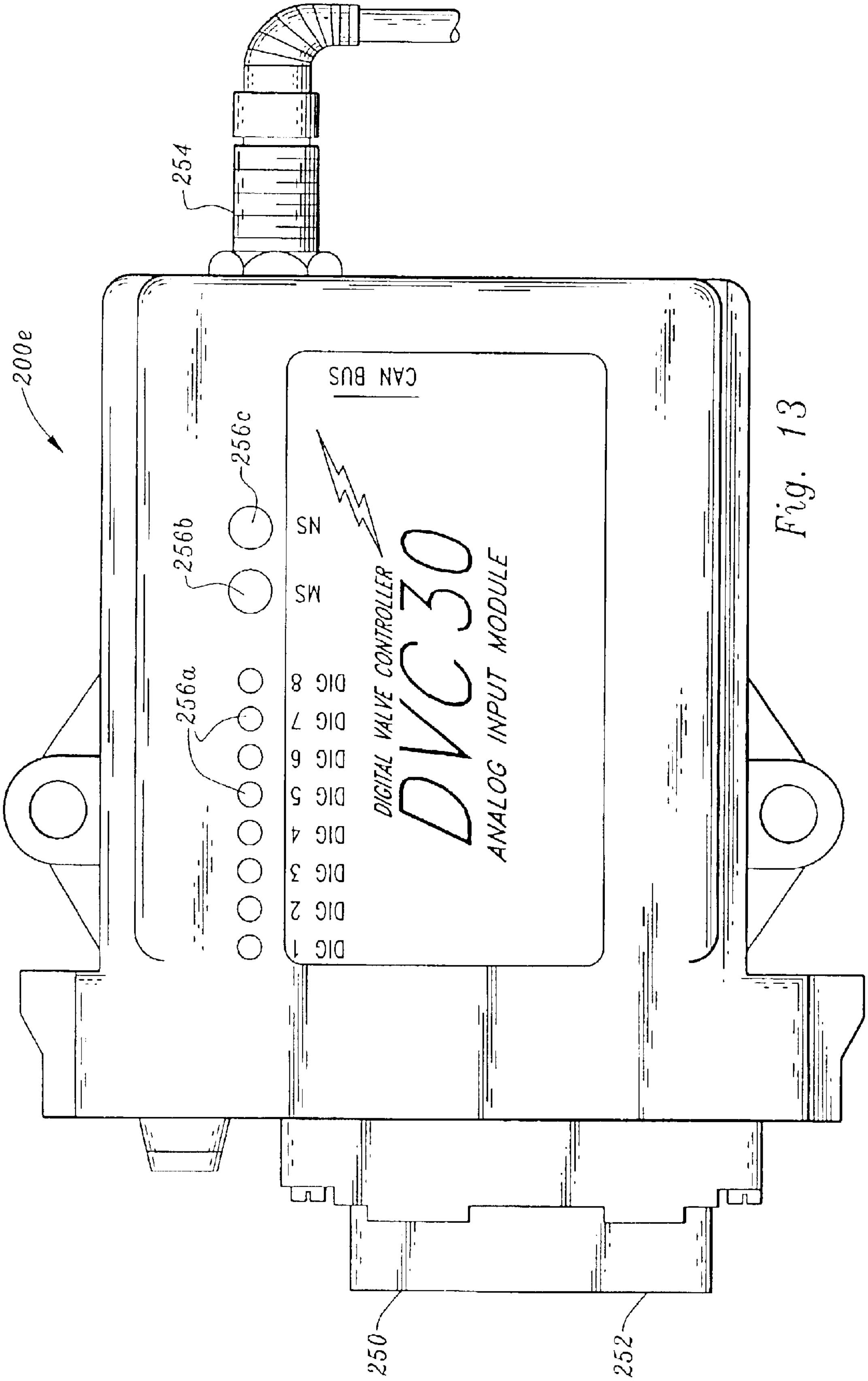
FIG. 13 depicts a module having additional inputs.

The analog input module 200*e* (FIG. 13*a*) provides additional analog and digital inputs to the system. The module includes power connectors 250, input connectors 252 (digital and analog, preferably including thermistor inputs), and a bus connector 254, preferably for connection to a DeviceNet-compatible CAN bus. LEDs 256*a*–c indicate status of each input connection 256*a*, the status of the module 256*b*, and the status of the network 256*c*.

Figure 15:
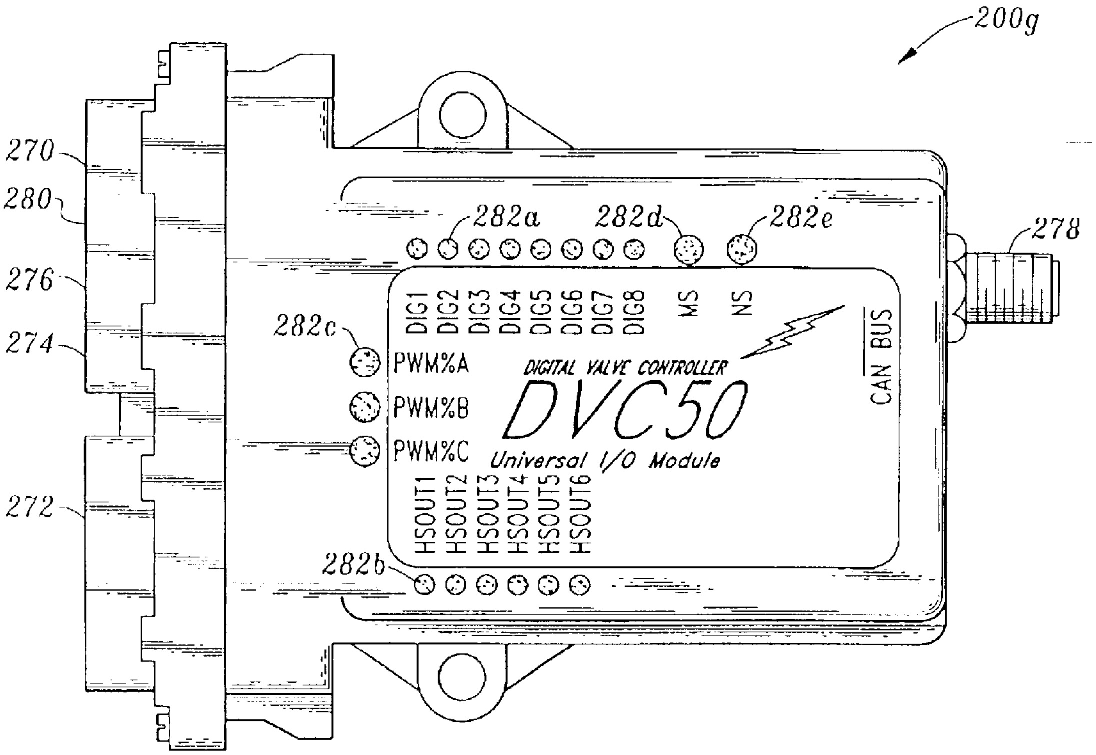
FIG. 15 depicts a universal I/O module.

The universal I/O module 200*g* (FIG. 15) provides additional output and inputs to the system. The outputs may be the same as those present in the master module 100. The universal I/O module includes power connectors 270, analog and digital input connectors 272, high-side output connectors 274, proportional output connectors 276, a bus connector 278, preferably for connection to a DeviceNet-compatible CAN bus, and a communication port 280, preferably an RS-232 port, for monitoring and setting the node number. LEDs 282*a*–c indicate status of each input 282*a*, the status of the module 282*b*, and the status of the network 282*c*. This module is programmed in the same way as the master module 100, through the programming environment 150.

Figure 11A:
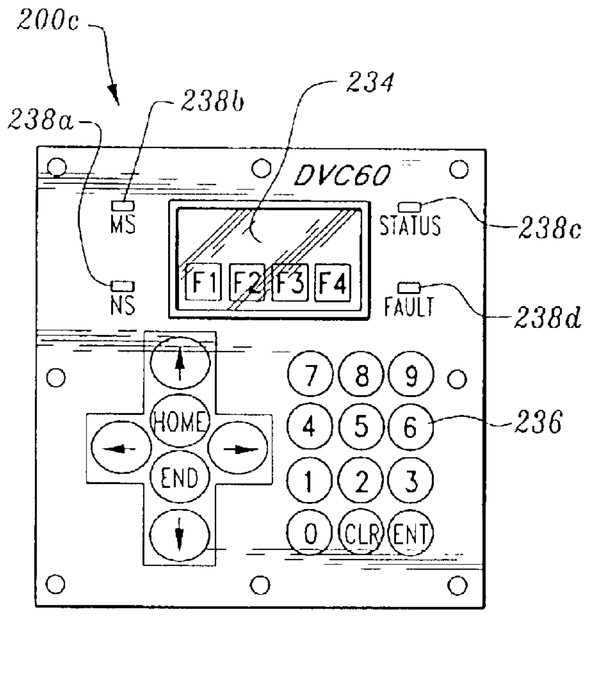
FIG. 11*a* depicts the front of a user-interface module.
Figure 11B:
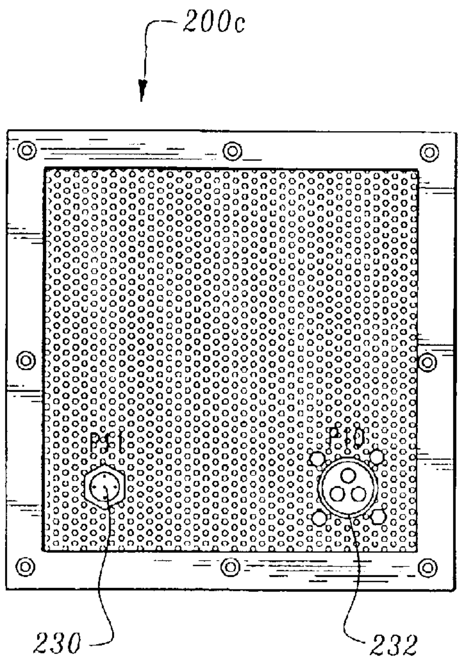
FIG. 11*b* depicts the back of a user-interface module.

An interface module 200*c* (FIG. 11) provides a link between the user and the system during operation, includes power connectors 230, a bus connector 232, preferably for connection to a DeviceNet-compatible CAN bus, and preferably features an LCD display 234, a keypad 236, and diagnostic LED indicators 238*a*–d. The LEDs indicate status of the module 238*a*, and status of the network 238*b*, and report general fault 238*c* and general status 238*d* information. The options available through the interface module 200*c*, a slave module to the master module 100, are programmed in the code for the master module 100, that is, in the programming environment 150, discussed hereinabove. The screens that appear on the display 234 are programmed in the programming environment 150 using the same type of logic code sequences as described for the master module 100.

Figure 12A:
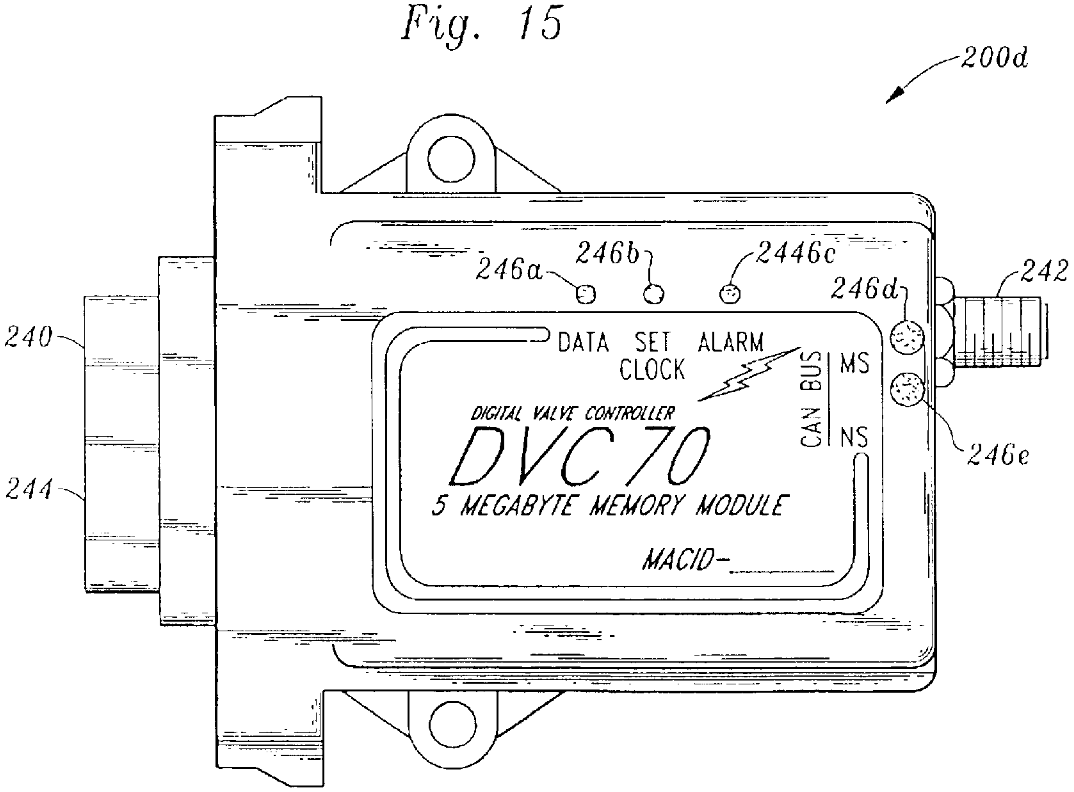
FIG. 12*a* depicts a memory module.
Figure 12C:
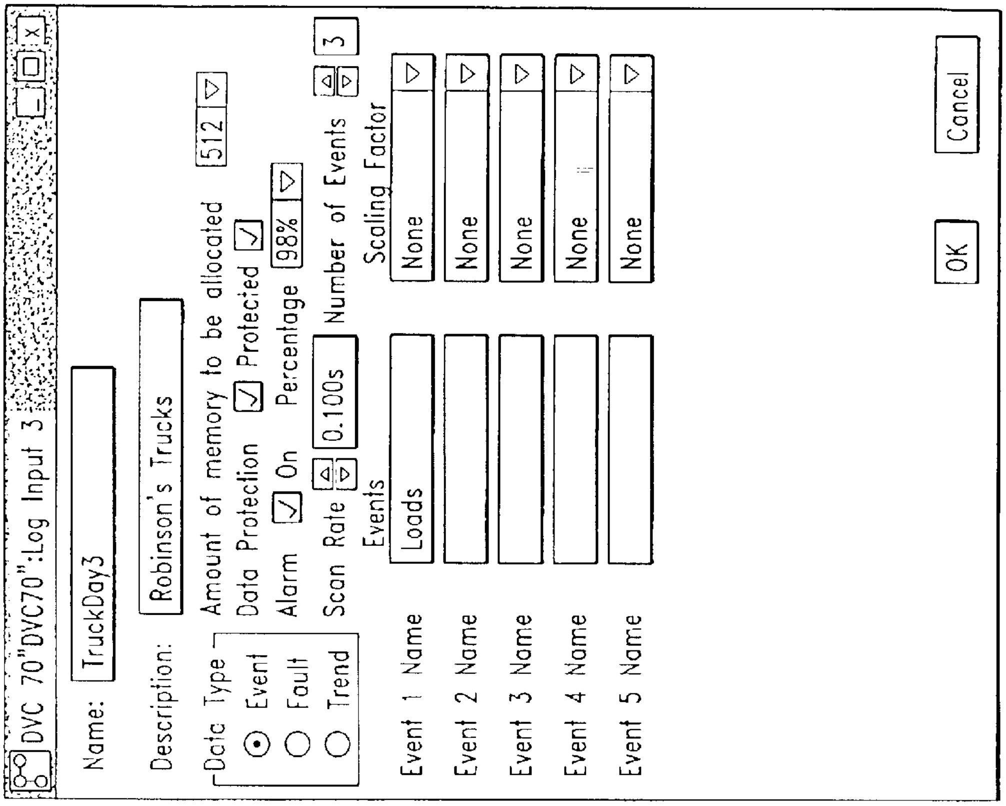
FIGS. 12*b*–12*c* show programming screens for a memory module.
Figure 12B:
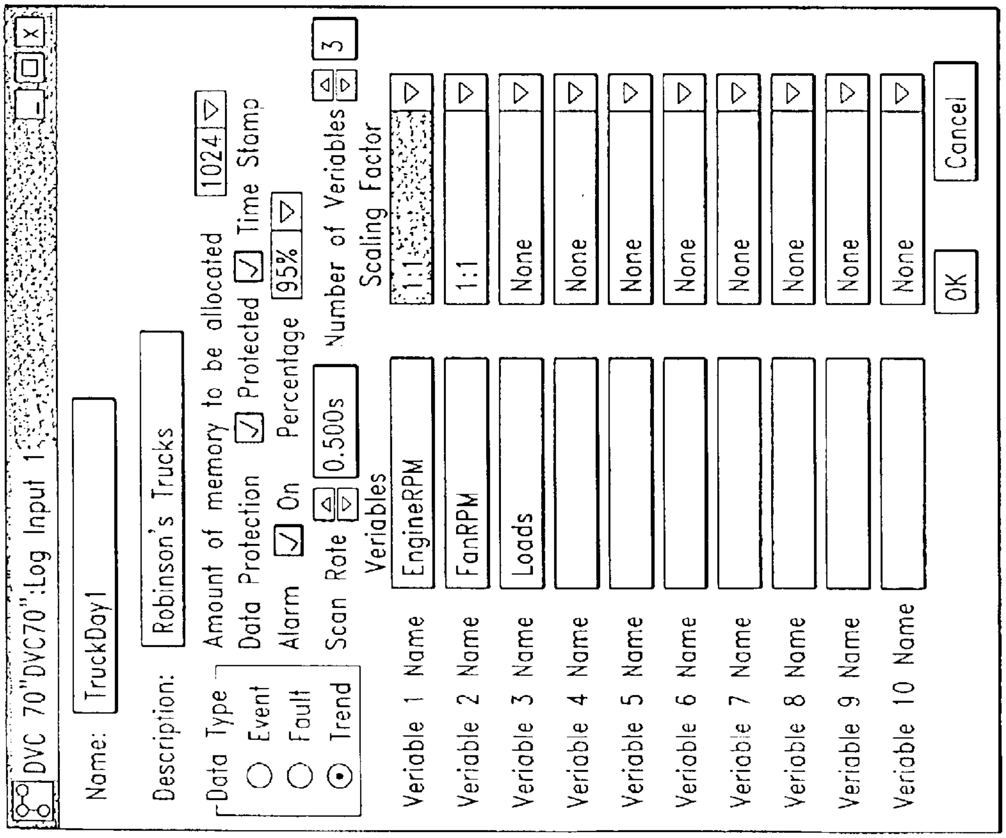

A memory module 200*d* (FIG. 12*a*) allows storage of trend, event, and fault data, each of which may be time-stamped when collected. This data may be exported, preferably through an RS-232 connection, into an external PC. The memory module 200*d* may be programmed (through the master module 100) to collect and store raw data (for later manipulation) or to apply calculations to or combine other data with the raw data before it is stored. The total memory available may be partitioned among the various collection streams. The memory module includes power connectors 240, a bus connector 242, preferably for connection to a DeviceNet-compatible CAN bus, and a communication port 244, preferably an RS-232 port, for monitoring, downloading, and setting the node number. LEDs 246*a*–e indicate data status 246*a*, status of the real-time clock 246*b*, alarm status 246*c*, status of the module 246*d*, and status of the network 246*e*. FIGS. 12*b* and 12*c* depict the programming producing the exported output in FIGS. 12*d* and 12*e*.

Figure 14:
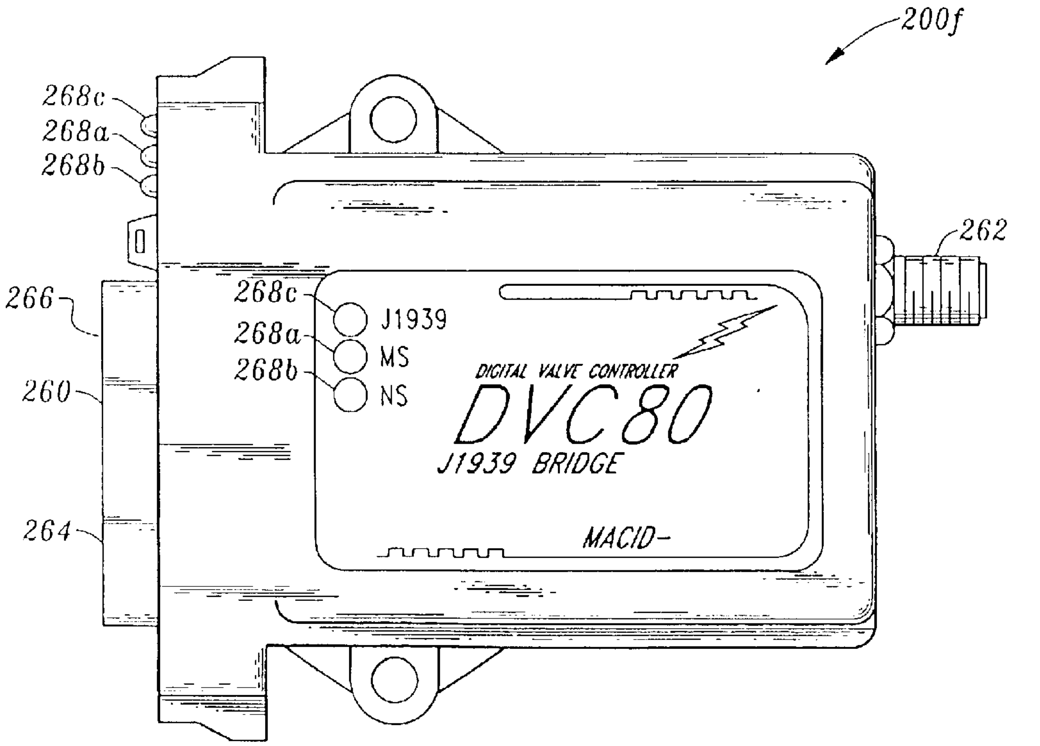
FIG. 14 depicts a bridge module for connection to an additional communication bus.

A bridge module 200*f* (FIG. 14) connects to the base connection bus 202 to another bus 204 (FIG. 4), preferably a bus utilizing the J1939 protocol. The bridge module 200*f* allows the master module 100 to obtain data from devices on the second bus 204 without adding a significant amount of traffic to either bus. In addition, the master module 100 may issue commands to a device on the second bus 204. Thus, the system of the present invention allows control of devices on a separate but attached bus 204 that utilizes a different protocol than the base connection bus 202. The bridge module includes power connectors 260, a bus connector 262, preferably for connection to a DeviceNet-compatible CAN bus, a second bus connector 264, preferably for connection to a J1939 CAN bus, and a communication port 266, preferably an RS-232 port, for monitoring, downloading, diagnostics, and setting the node number. LEDs 268*a*–c indicate the status of the module 268*a*, the status of the base network 268*b*, and the status of the second network 268*c*.

An external display 200*h* may be connected directly to the base connection bus 202 to monitor the entire system.

Figure 16A:
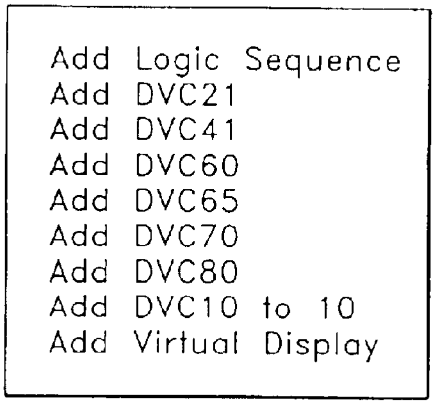
FIGS. 16*a*–16*b* depict the programming environment with respect to adding modules to the system.
Figure 16B:
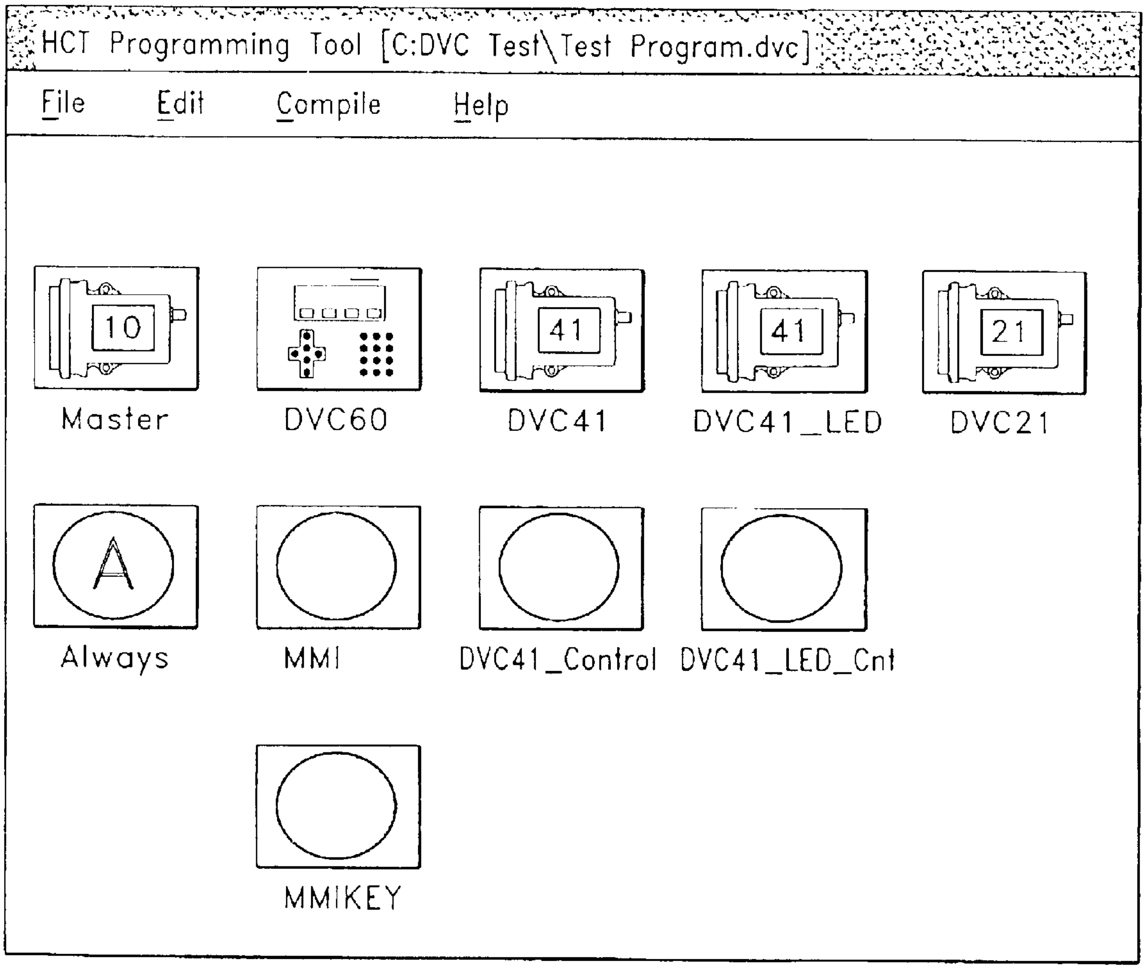

The interface for the programming environment 150 allows easy addition of modules to the system (FIGS. 16*a*,16*b*). FIG. 16*a* depicts the selection screen for modules, and FIG. 16*b* depicts the graphic display of modules present in a system.

Moreover, having thus described the invention, it should be apparent that numerous structural modifications and adaptations may be resorted to without departing from the scope and fair meaning of the instant invention as set forth hereinabove and a described hereinbelow by the claims.

We claim:

1. A method for graphically defining and managing input/output functions for a controller, the steps including:

connecting a controller and a work-performing device;

displaying output for said work-performing device as a function of input in a graphical format;

specifying a plurality of movable points on said graphical format; and allowing control of nonlinear response of said work-performing device by said controller via movement of said plurality of movable points, whereby nonlinear response of said work-performing device is predictably controlled.

2. A control apparatus for control of hydraulic valves, comprising, in combination:

input means, said input means programmable by a user; and output means responsive to said input means, wherein said output means includes a coil having a high side and a low side and means for controlling both said sides, said means for controlling both said sides including parameters for said high side and said low side, said parameters entered by a user, wherein said output means produces either an output having a constant supply source voltage or a PWM output that sinks current to ground at a pulse-width-modulated frequency, wherein said PWM output may be configured to a particular current range, wherein said frequency is between 19 kHz and 20 kHz, and wherein a dither frequency is superimposed on said frequency.

3. A user-interface module for a hydraulic device control system, comprising in combination:

network communication means, wherein said network communication means receives programming from an external source having an output, said output monitored by display means, wherein content of said display means is determined by said programming received over a network through said network communication means; and input means feeding the network, said input means responsive to manual external input, wherein said manual external input is controlled from a series of choices contained on said display means, whereby said input means affect device control of the hydraulic device control system.

4. A control apparatus for control of hydraulic valves, comprising, in combination:

input means, said input means programmable by a user, wherein said input means includes means having a single portal, wherein said input means are responsive to inputs comprising analog input and non-analog input; and output means responsive to said input means, wherein said output means includes a coil having a high side and a low side and means for controlling both said sides, said means for controlling both said sides including parameters for said high side and said low side, said parameters entered by a user, wherein said output means produces either an output having a constant supply source voltage or a PWM output that sinks current to ground at a pulse-width-modulated frequency, wherein said frequency is between 19 kHz and 20 kHz, wherein said PWM output may be configured to a particular current range, and wherein a dither frequency is superimposed on said frequency.

5. A control apparatus for control of hydraulic valves, comprising, in combination:

input means;

output means responsive to said input means, said output means comprising output groups, said output groups having means for specifically controlling parameters about output from said output means; and means for adding low frequency dither to said output when said output consists of high frequency proportional output.

6. The control apparatus of claim 5 further comprising user-activated means to adjust amplitude and frequency of said low frequency dither.

* * * * *